United States Patent Office 3,695,899
Patented Oct. 3, 1972

3,695,899
METHOD OF PRESERVING FOOD
Chi-Hang Lee, Spring Valley, and Jacob Richard Feldman, New City, N.Y., assignors to General Foods Corporation, White Plains, N.Y.
No Drawing. Filed May 18, 1970, Ser. No. 38,593
Int. Cl. A23l 3/00, 7/00
U.S. Cl. 99—150                    4 Claims

ABSTRACT OF THE DISCLOSURE

Food spoilage caused by the undesirable growth of microorganisms can be prevented by adding small amounts of thioisomaltol or hydrolyzable derivatives of thioisomaltol to the food.

---

This invention relates to the discovery that thioisomaltol is a potent and wide-spectrum antimicrobial agent that has wide application in the food, cosmetic and pharmaceutical industries, as food preservatives and medicinal components.

In particular, this invention relates to the preservation of foodstuffs by incorporating small but effective amounts of thioisomaltol into the food; the amounts usually ranging from about 0.005% to 0.5% by weight of the food.

Thioisomaltol as referred to in this invention is meant to include thioisomaltol itself as well as the derivatives of thioisomaltol that readily hydrolyze to yield thioisomaltol, such as the non-toxic salts and esters or mixtures of any of these.

Among the salts of thioisomaltol which may be used in this invention are the alkali metal salts such as sodium and potassium, the alkaline earth salts such as magnesium and calcium, as well as the zinc, iron, manganese, and ammonium salts. Also included are the salts of organic amines such as the salts of sec-butylamine, triethanolamine, and the like.

The esters of thioisomaltol which may be used in this invention include both the inorganic esters such as the sulphate and phosphate esters as well as the organic esters such as the formate ester.

Thioisomaltol is the common name for the chemical compound, 2-acetyl-3-hydroxy-thiophene, the chemical preparation of which is set forth in an article by Jacobsen and Lawesson found in Tetrahedron, 1965, vol. 21, pp. 3331 to 3349. The structure of thioisomaltol is:

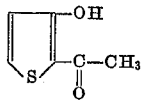

It has previously been disclosed in British Pat. No. 1,077,690 that isomaltol will preserve foodstuffs against microorganisms. It has now been found that thioisomaltol, which is a more stable compound than isomaltol, can be used for similar purposes, and that thioisomaltol is about three times more effective as an antimicrobial agent than is isomaltol.

Thioisomaltol is normally added to the foodstuff in amounts ranging from 0.005% to 0.5% by weight of the food. The low level of thioisomaltol which is able to impart microbial stability to the foodstuff is a particularly advantageous feature of this invention since the permissible amount of food additives is usually set at a relatively low level by the controlling governmental agencies. Low levels of antimicrobial agents are also desirable since the presence of off-tastes and flavors will not be imparted to the foodstuff.

We have found that when thioisomaltol or one of its hydrolyzable derivatives is added to foodstuffs, it preserves them from the growth of harmful organisms for extended periods of time. While cold storage or freezing ordinarily preserves food for long periods, these are not always convenient, economical or effective methods of preservation. We have found that foods containing small amounts of thioisomaltol can be stored at room temperatures for much longer periods than untreated foods without becoming spoiled. Of course, freezing or storing at low temperatures will protect the foods treated according to the process of this invention for even longer periods. While the process of this invention is particularly valuable in preserving food at room temperatures, it is also applicable for preserving foods at lower temperatures. In addition, where foods are stored at temperatures higher than room temperature, as for instance in warehouses or in shipping, the process of this invention greatly extends the storage life of foods and prevents spoilage.

Examples of the foodstuffs contemplated for use in this invention are those where freezing and cold storage are not entirely effective or those foods whose flavor is lost on freezing. Examples of foods on which freezing or cold storage is not entirely effective are fresh fruits including berries and vegetables. When this type of food is shipped from California to New York, either in refrigerated cars or in a carbon dioxide atmosphere, a certain percentage of the shipment is lost due to spoilage. Examples of foods whose flavor is lost by freezing, or the freezing of which is not economical, are processed foods such as bakery products like breads, cakes, cookies and pies. By the term "processed foods" is meant those foods which are mixed or treated in some way prior to being sold. Processed foods which can be effectively preserved by the process of this invention are cheeses, dog foods, and shredded coconut.

These are several methods which are effective in applying thioisomaltol or its salts to foodstuffs. Applications by spraying the food or dipping the food in dilute solutions of thioisomaltol or its salts have been found to be convenient, effective and economical. The addition of these compounds to processed foods by simply mixing a solution of thioisomaltol into the food has also proven most convenient. Other methods or combinations of methods which are known in the food processing industry are also applicable. For example, in mixing large commercial quantities of cake mix, the thioisomaltol may be blended with the shortening before mixing the shortening with the other cake ingredients. In this manner, the thioisomaltol is used to preserve the shortening in storage, the cake mix on the grocer's shelves and the final finished cake as well.

An embodiment of the process of this invention as it relates to the preservation of fresh fruits, including berries, and vegetables comprises dipping said fruits, berries and vegetables in an aqueous solution of thioisomaltol or one of its salts. The foods so treated can then be stored at room temperature, frozen or put in cold storage areas. Another convenient method of applying these preservatives comprises spraying solution of thioisomaltol or one of its salts on the fruits, berries or vegetables. For convenience and economy, a 1% solution can be effectively applied to large batches of fruit or vegetables in open containers with a hand sprayer. Of course, a compressed air or an electric sprayer would also be useful. Where the application must be performed in the shortest possible time, a 10% solution of the sodium or potassium salts of thioisomaltol is most conveniently used. Where large quantities of foodstuffs are stored such as in railroad cars or commercial storage bins, the vapor phase method of preserving food with thioisomaltol is very convenient. The simplest method of vaporizing the thioisomaltol is to drop aqueous solutions on a heated electrode within the sealed or semi-closed storage area. Of course for commercial applications, such as for use in refrigerated railroad cars, the thioisomaltol vapor can be metered into the atmosphere by a suitable device. In this manner, a 0.1% concentration based on the weight of food in storage may be readily maintained in the atmosphere of the storage area. The use of such devices also allows the thioisomaltol vapor to be used in conjunction with a high carbon dioxide concentration in the air. The use of carbon dioxide as a preserving atmosphere and other methods for supplying such an atmosphere are well known in the food preserving and shipping trades.

Another method which we have found effective in applying thioisomaltol to foods, comprises applying solutions of thioisomaltol or one of its salts to wrapping papers, paper cartons or carton liners used for storing food. For this type of application, the packing papers of paper cartons are weighed and dipped in a 10% solution of a salt of thioisomaltol. The papers are then inserted into the cartons so as to give an effective concentration of thioisomaltol based on the weight of the foodstuff. The papers need not be in direct contact with the surface of the food to be effective. Similarly, the food may be placed in paper boxes treated with either thioisomaltol or one of its salts.

A modification of the method for applying thioisomaltol to paper food wrappers and cartons which we have found effective in preserving foods, comprises milling thioisomaltol or one of its non-toxic salts into a plastic film such as polyvinylidene chloride, polyethylene or polyvinyl chloride. The procedures of preparing such films are well known in the plastics processing art.

The invention is further described by, but not limited to, the following example:

EXAMPLE

The antimicrobial activity of thioisomaltol was tested on the microflora of corn flour. Corn flour was adjusted to a moisture content of 25% and incubated at room temperture for 48 hours to increase the microbial count. This flour was used to prepare a slurry consisting of 1 gram of corn flour per 100 ml. of isotonic saline. Two ml. of this slurry were plated together with 1.0 ml. of a solution of 1% thioisomaltol into 8 ml. of nutrient (agar). This gives a final concentration of thioisomaltol of 0.09% by weight. After four days these plates were free of microbial growth. Control plates without the addition of thioisomaltol were completely overgrown with bacteria and molds. This shows that thioisomaltol substantially inhibits the growth of both bacteria and molds.

Comparable antimicrobial activity is observed with the use of the sodium salt of thioisomaltol.

Comparison tests were made in accordance with the procedure set forth in the above example, and it was found that a final concentration of 0.3% by weight of isomaltol was necessary in order to effectively inhibit microbial growth.

It will be apparent that there are variations and modifications of this invention which may be employed without departing from the scope of this invention.

Having thus described the invention what is claimed is:

1. A process for preserving foodstuffs which comprises contacting the foodstuff with an effective amount of from about 0.005% to 0.5% by weight of the foodstuff of an antimicrobial agent selected from the group consisting of thioisomaltol, hydrolyzable derivatives of thioisomaltol, and mixtures of any of these.

2. A process according to claim 1 wherein the hydrolyzable derivatives are the non-toxic salts and esters of thioisomaltol.

3. A process according to claim 1 wherein the foodstuff is contacted with a dilute solution of the antimicrobial agent.

4. In a process for substantially inhibiting microbial activity in foodstuffs comprising the use of an effective amount of a wide spectrum antimicrobial agent, the improvement comprising the use of thioisomaltol or the hydrolyzable derivatives of thioisomaltol in an amount of from about 0.005% to 0.5% by weight of the foodstuff as the antimicrobial agent.

References Cited

FOREIGN PATENTS 1,077,690   8/1967   Great Britain _____ 99—157

OTHER REFERENCES

"Tetrahedron," 1965, vol. 21, pp. 3331–3349, inclusive, article entitled, "Thiophene Chemistry-X" by Jakobsen et al.

HYMAN LORD, Primary Examiner

U.S. Cl. X.R.

99—154, 171 CA, 222, 224; 424—275